June 24, 1930.  G. E. HOWARD  1,766,638
DRAWING GLASS TUBING
Filed May 28, 1923  4 Sheets-Sheet 1

INVENTOR
George E. Howard
By Kay Totten Brown
Attorneys

June 24, 1930.  G. E. HOWARD  1,766,638
DRAWING GLASS TUBING
Filed May 28, 1923   4 Sheets-Sheet 4

INVENTOR
George E. Howard,
By Kay, Totten & Brown,
Attorneys

Patented June 24, 1930

1,766,638

UNITED STATES PATENT OFFICE

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE

DRAWING GLASS TUBING

Application filed May 28, 1923. Serial No. 642,021.

My invention relates to the manufacture of drawn glass tubing, and it has special reference to the drawing of tubes from glass having low heat-expansion, high melting temperature and long range of plasticity, such, for example, as the borosilicate heat-resisting glasses of the "Pyrex" type.

One object of my invention is to provide a continuous method of drawing glass tubing by which accurate tubes, suitable for gauge glasses, combustion tubing, pipe linings and the like, may be drawn from heat-resisting glass of the character indicated.

Another object of my invention is to provide the essential apparatus elements for carrying out my improved tube-drawing method.

The manufacture of tubing from heat-resisting glass presents a number of difficulties, among which may be mentioned the high temperature at which the molten glass must be kept in order to issue properly from an orifice, and the rapid loss of heat which occurs as soon as the glass emerges into the air and which causes correspondingly rapid changes in the viscosity of the glass. For these reasons, heat-resisting glass tubing has heretofore been drawn exclusively by the hand method, wherein a mass of the glass is gathered and is formed, by blowing, into a tubular blank, the ends of this blank being then attached to drawing implements which are drawn apart to elongate the blank and reduce its thickness. As the tube is drawn, it sags downwardly and takes the form of a catenary curve, with the result that only a small central portion of the tube can be made sufficiently straight for later use. This hand-drawing method is therefore slow and wasteful.

According to my present invention, I produce glass tubing continuously by causing an annular stream of glass to issue from a receptacle through a downwardly opening outlet which determines the outer diameter of the issuing glass, cooling the outer and inner surfaces of the glass at a regulated rate as it emerges from the outlet, and passing the glass through a former which shapes the glass into a tube of approximately the desired outside dimension and further cools the outer surface of the tube. Then, after a reheating interval, during which the chilled surfaces of the glass are equalized in temperature by heat transmitted from the hotter interior portions of the walls of the tube, the tube is passed downwardly through a sizer which is arranged to bring the tube, while the glass is still plastic, to its final correct size, and finally the tube is engaged by drawing implements which assist the action of gravity in drawing the tube downward. The tube is thus passed through the several shaping mechanisms by the combined action of gravity and the downward pull exerted by the drawing implements. If the tube is drawn horizontally or in any direction other than vertically downward, the operations are the same, except that the effect of gravity is, of course, modified.

Discharge outlets of various diameters may be provided, so that the outer diameter of the issuing stream may be changed as desired, and the inner diameter of the stream may be changed by varying the amount of glass which issues, such variation being produced by means of an adjustable plug or otherwise.

Other features of my invention relate to the arrangements for controlling the flow of glass from the receptacle, for ironing or compressing the tube in the forming stage, for reheating and swelling the tube during the sizing operation, and for automatically cutting off lengths of the finished tubing.

In the accompanying drawing.

Figures 1, 2:
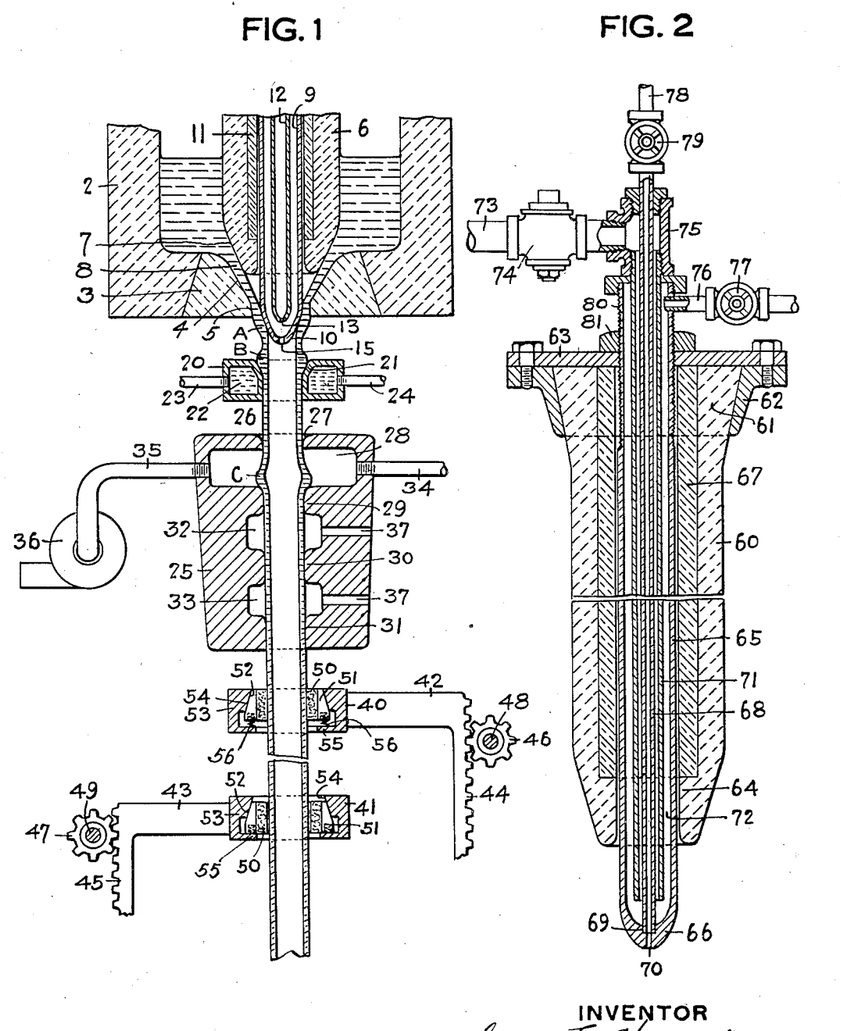
Fig. 1 is a diagrammatic vertical sectional view taken through a drawing apparatus constructed in accordance with my invention, the section being taken on the axis of the glass tube that is being drawn.
Fig. 2 is an enlarged vertical central sectional view through a plug and mandrel which may be used to control the discharge of glass from the container.

In Fig. 1 the numeral 2 indicates a receptacle for molten glass which may be a pot, a boot extending from a tank furnace, or any other suitable container. Means are preferably provided for maintaining the glass in the receptacle at a constant level, and at constant temperature. Such arrangements are common in the glass-feeding art, and are therefore not illustrated herein.

The glass is discharged from the receptacle 2 through an opening formed in a removable bushing 3, this opening having converging side walls 4 terminating in an outlet 5. A tube or mandrel 6 of refractory material, having a conical lower end 7, is adjustably mounted above and in line with the discharge outlet so as to establish an annular channel 8 through which the glass flows, the cross-section of this channel being determined by the vertical position of the tube 6. The member 6 thus serves as a former to impart the desired tubular shape to the issuing glass.

A mandrel or arbor 9, suitably consisting of a metal tube having a conical lower end 10, is contained within the refractory tube 6, and projects below the refractory tube. As shown in Fig. 1, the lower end of the mandrel 9 also projects somewhat below the discharge opening 5 in the receptacle 2, and thus assists in determining the internal bore of the flowing stream of glass. The mandrel 9 should be adjustable vertically and independently of the tube 6, and one method of making such adjustment is shown in Fig. 2 which will be described below.

Heat-insulating material may be provided, as indicated at 11, between the outer tube 6 and the mandrel 9, so as to enable the mandrel to be kept cool and also to prevent the cold mandrel from chilling the glass before it issues from the annular channel 8. For the purpose of cooling the mandrel 9, air, water or other cooling fluid is passed through the mandrel. One means for doing this is shown in Fig. 1, and consists of an inner tube 12 having an opening 13 in its reduced lower end. Air may be forced down through the tube 12 and will pass up through the space 14 between the tube 12 and the mandrel 9. A vent 15 may be formed in the lower end of the mandrel 9 to permit part of the air introduced through the tube 12 to escape into the interior of the glass tube, thus assisting in cooling the inner surface of the glass. Other cooling arrangements will be described in detail below.

Below the discharge opening 5 is a former 20 which should be vertically adjustable, and which has a flared or belled opening 21 for receiving and initially forming the outside of the tube. The vertical thickness of the former, and also the angle at which the opening 21 is flared, may be varied as desired, or as operating conditions may require. The former is kept cool, for the purpose of chilling the outer wall of the tube, by means of water, air or other cooling fluid which may be introduced into the hollow interior cavity 22 of the former and removed therefrom through pipes 23 and 24. The former may be rotated for ironing the tube, and reducing its diameter, or separate means for this purpose may be associated with the former 20 as illustrated in later views.

Spaced some distance below the former 20 is a sizer 25. In the free space 26 between the former 20 and the sizer 25 the glass is given an opportunity to reheat or equalize in temperature, thus softening somewhat the chilled skins which have formed on its inner and outer surfaces.

In passing downward through the sizer 26 the glass first encounters an upwardly flaring opening 27 of about the same size as the initial outside diameter of the tube, and next enters a space 28 which is maintained under sub-atmospheric pressure for swelling the still plastic tube to insure its engagement with the subjacent sizing rings, 29, 30, and 31. These sizing rings are separated by spaces 32 and 33 which, like the space 28, may be kept under sub-atmospheric pressure to maintain the glass in contact with the sizing rings. It is intended that the glass shall be chilled, before reaching the spaces 32 and 33, sufficiently to prevent any substantial swelling under the sub-atmospheric pressure therein, but a small amount of lateral swelling is permissible at these points as well as in the upper space 28. The sizing openings and the reduced-pressure chambers may be formed in a single body of metal or other suitable material, as indicated in Fig. 1 or, if desired, the several sizing rings and reduced-pressure chambers may be constructed separately and assembled in proper relation to engage the tube, and may be spaced apart to any desired extent.

If the glass is not sufficiently reheated in the space 26, additional heat may be supplied in the swelling chamber 28. For this purpose I provide a pipe 34 for admitting fuel and air to the space 28, a pipe 35 for withdrawing products of combustion, and a fan 36 for maintaining sub-atmospheric pressure in the chamber 28. A flame may thus be maintained in the chamber 28 while at the same time the pressure in this chamber is sufficiently reduced to cause the necessary swelling.

The cooling chambers 32 and 33 are provided with ports 37 which may be connected to the blower 36 or to other suitable suction apparatus for maintaining reduced pressure in these chambers.

The finished tube issuing from the lower end of the sizer 25 is pulled downward at a constant rate by means of drawing members, which are indicated as clamps 40 and 41 and which are carried by arms 42 and 43, respectively. These clamps are alternately driven by means of racks 44 and 45 which are engaged by pinions 46 and 47, respectively, on shafts 48 and 49, each of these shafts being driven alternately in opposite directions to raise and lower the clamps. The clamps may be lined with felt, asbestos or other suitable friction material which is indicated at 50.

The clamps may be constructed in any suitable manner to engage the glass while the clamps move downward, and to release the glass while moving upward. As shown, each of the clamps consists of split sections 51 which have upwardly converging conical outer surfaces 52 and are received within a holder ring 53 having a conically tapered inner surface 54 adjacent to the conical surfaces 52 of the clamp sections. The holder ring 53 also has an annular flange 55 which prevents the clamp sections 51 from dropping out of the holder 53. A spring may be provided for holding up the sections 51 when the clamp begins to descend, thus insuring that these sections will be engaged by the surfaces 54 of the ring 53 and forced against the glass tube. When the clamp rises, the portions engaging the glass are free to slide upon the glass, but when the clamp moves downward the conical surface 54 of the holder engages the surfaces 52 of the clamp sections with a wedging action, and forces these sections to engage the glass and draw it downward.

In the operation of the system as shown in Fig. 1, the glass descends in the annular channel 8 and issues from the opening 5 in an annular stream A, the interior of which is chilled somewhat by contact with the protruding end 10 of the mandrel 9, this cooling effect being increased by the air which is blown through the vent 15. The annular stream is received in the former 20, accumulating somewhat on the flaring upper portion of the former, because the cylindrical opening through the former is of less diameter than the discharge opening 5, this accumulation being indicated at B, Fig. 1, and insuring that the glass at this point will be certain to touch the walls of the former. The glass is then drawn down through the former by the action of gravity, assisted somewhat by the pull exerted by the drawing clamps, and is thus brought to approximately its correct outer diameter. At the same time, the chilled skin which begins to form on the outer surface of the glass as soon as it issues from the outlet 5 is increased in thickness by contact with the cooled former. The initially formed tube is then allowed to reheat or equalize its temperature in the space 26. The space 26 may be lengthened or shortened by raising or lowering the apparatus shown below the reheating space, and the effect of this reheating is to bring the glass to approximately uniform consistency suitable for the later sizing operation, while still maintaining its tubular shape.

The glass next passes through the opening 27 into the swelling space 28, where the glass expands under the influence of sub-atmospheric pressure, and is heated further if the automatic reheating in the space 26 has not been sufficient to restore enough plasticity to the glass. The application of flame at this point may also be utilized to regulate the cooling of the glass, so that it will not be too sudden, which would result in cracking or checking, or too slow, which would delay too long the necessary setting or hardening of the tube. The enlarged or swelled condition of the glass in the space 28 is shown in exaggerated form at C, Fig. 1. It is only necessary that the enlargement be sufficient to give the tube at this point a temporary diameter slightly larger than that of the first sizing ring 29.

The sizing rings 29, 30 and 31 act successively upon the glass while it is being cooled, and impart the final correct shape to the tube. The cooling of the glass is hastened by providing the spaces 32 and 33 which have the additional function of maintaining the diameter of the tube by reason of the sub-atmospheric pressure maintained therein. By the time that the tube has emerged from the sizer, it is set sufficiently so that further shrinking and hardening of the glass will not materially alter its size or shape. The finished tube D is next engaged by the drawing clamps which draw the tube down at a speed which is constant for any given operation, although this speed may be changed to suit various sizes of tubing or other operating conditions. The drawing clamps work alternately upon the tube, each clamp taking hold of the tube before the other clamp has been released, so as to exert a continuous positive pull upon the tube.

Figure 2 shows in detail one manner in which the regulating plug and mandrel may be constructed so as to be water-cooled while at the same time air is forced through the lower end of the mandrel. The outer refractory plug 60 has a flaring upper end 61 which is received in a supporting ring 62 secured to the under side of a plate 63 which may be adjustably supported by any convenient means such as are well known in the glass-feeding art. The hollow interior of the plug 60 is reduced in diameter near its lower end, as shown at 64, and a hollow mandrel 65, having a rounded lower end 66, extends through the plug 60 and through an opening in the upper plate 63. The space between the plug 60 and the mandrel 65 may be filled with heat-insulating material 67.

A small tube 68 extends the full length of the mandrel 65 and its lower end is secured in a recess at the lower end of the mandrel, as shown at 69. A small opening 70 is formed in the lower end of the mandrel and communicates with the interior of the tube 68 for the purpose of admitting air from this tube into the interior of the stream of glass which flows down around the lower end of the mandrel. Surrounding the tube 68 is another tube 71 through which cooling fluid may be introduced into the space 72 between the tube 71 and the mandrel 65. This cooling fluid is brought to the mandrel through a pipe 73 controlled by a valve 74 and communicating through a suitable fitting 75 with the upper end of the intermediate tube 71. The cooling fluid is withdrawn from the upper end of the space 72 through a pipe 76 controlled by a valve 77. Air is brought to the central tube 68 by a pipe 78 controlled by a valve 79.

The upper portion of the mandrel tube 65 is externally screw-threaded, as shown at 80, and a nut 81 is applied to this screw-threaded portion and rests upon the plate 63. By means of this nut the vertical position of the mandrel within the plug 60 may be adjusted within considerable limits.

Figure 3:
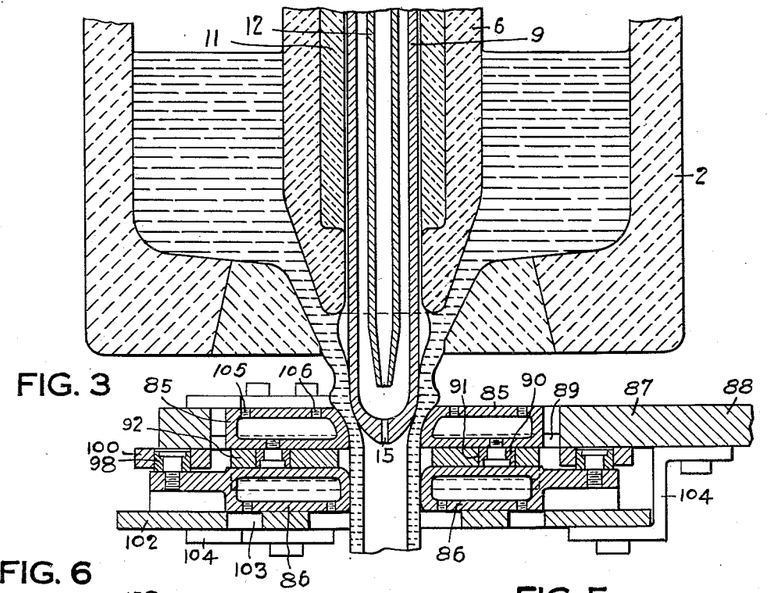
Fig. 3 is an enlarged vertical sectional view of the upper portion of the system, showing a modified arrangement of the plug, mandrel and former, the former being shown in developed section on the line 3—3, Fig. 5.

Fig. 3 shows a modified arrangement of the mandrel and the former, wherein the mandrel extends nearly into contact with the former so as to control the inner diameter of the glass at the time when the glass enters the former. The receptacle 2 and plug 6 are arranged as in Fig. 1, and the mandrel, as in Fig. 1, is provided with a central air tube 12 and with a vent opening 15. The lower end of the mandrel 9 projects into the flaring opening in the former, and the plug 6, the mandrel 9, and the former may all be independently adjustable vertically so as to regulate the flow of the glass to keep the space between the mandrel and the former filled with glass without permitting the glass to lap and pile up sufficiently to clog the apparatus. This arrangement of the mandrel adjacent to the former has the advantage that the descending glass cannot thicken internally in the space between the mandrel and the former.

Figure 5:
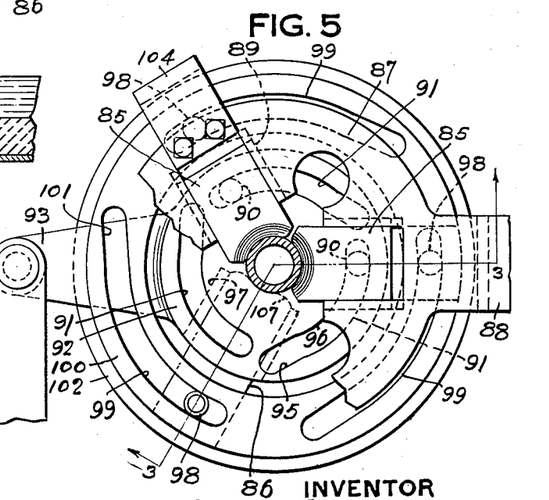
Fig. 5 is a plan view, with parts broken away, of the ironing device shown in Fig. 3 with the mandrel removed.

The former shown in Figs. 3 and 5 is composed of upper sections 85 and lower sections 86. All of these sections are arranged for radial movement toward and from the descending stream of glass, and the lower sections 86 are also arranged to be oscillated or reciprocated around the axis of the descending stream so as to iron or compress the glass. All of the former sections are supported from a stationary ring 87 which may have extensions 88 for adjustable attachment to any convenient stationary support, not shown.

The upper former sections 85 are slidably mounted in T-slots 89 formed in the ring 87 and are provided with depending rolls 90 which are received in curved cam slots 91 formed in a ring 92 that is secured beneath the stationary ring 87 and is arranged to be oscillated around the axis of the glass stream, suitably by means of an arm 93. Each of the cam slots 91 has a straight portion 95 and a concentric portion 96. The straight portions 95 serve to move the former sections 85 radially toward and from the glass stream while the concentric portions 96 permit the cam ring 92 to be turned through a considerable arc without moving the former sections 85. The drawing shows three of the upper former sections 85, but it will be understood that any desired number of these sections may be provided. The lower or ironing sections 86 of the former are slidably mounted in T-slots 97 formed in the under side of the cam-ring 92. Each of the ironing sections 86 is provided with an extension carrying a roller 98 which is received in a cam-slot 99 formed on the under side of a ring 100 which is secured beneath the supporting ring 87. When the movable ring 92 is rocked by means of the arm 93, or otherwise, the former sections 86 are likewise rocked around the axis of the descending stream of glass. For the purpose of also imparting an inward and outward radial movement to the sections 86, the cam-slots 99 are provided at their ends with straight portions 101. The ironing members 86 may be supported from beneath by means of a ring 102 which may be provided with slots 103 to reduce its weight, and which is mounted in brackets 104 secured to the supporting ring 87.

The operation of the former just described may be best understood by assuming that the sections 85 and 86 are retracted from the descending glass, at which time the rollers 90 of the upper former sections are at the straight ends of the cam-slots 96, while the rollers 98 of the lower sections 86 are at the straight ends 101 of the cam-slots 99. If the ring 92 is moved in a clockwise direction, Fig. 5, the straight portions 95 and 101 of the slots 91 and 99 will move the former sections 85 and 86 simultaneously inward until the rollers 90 and 98 enter the concentric portions of the slots 91 and 99, whereupon the radial movement of the sections ceases, and the continued movement of the ring 92 causes the lower former sections 86 to rock in contact with the glass, thereby ironing or compressing the glass. The ironing members may thus be rocked through any desired angle within the limits of the concentric portions of the cam-slots 91 and 99.

The former sections 85 and 86 are preferably made hollow as shown in Fig. 3, and may be provided with tapped openings 105 and 106, respectively, for attachment to flexible pipes connected to a source of water, air or other cooling fluid, such flexible connections providing for the necessary movement of the former sections. The ends of the ironing members 86 should be relieved at the corners, as shown at 107, Fig. 5, so that they will not dig into the glass as sharp corners would do.

It will be understood that my invention is not limited to the details of construction shown in Figs. 3 and 5, which have been selected merely for the purpose of illustrating one construction by which a sectional former may be arranged for radial movement toward and away from the glass and also for rocking movement in contact with the glass.

Figure 4:
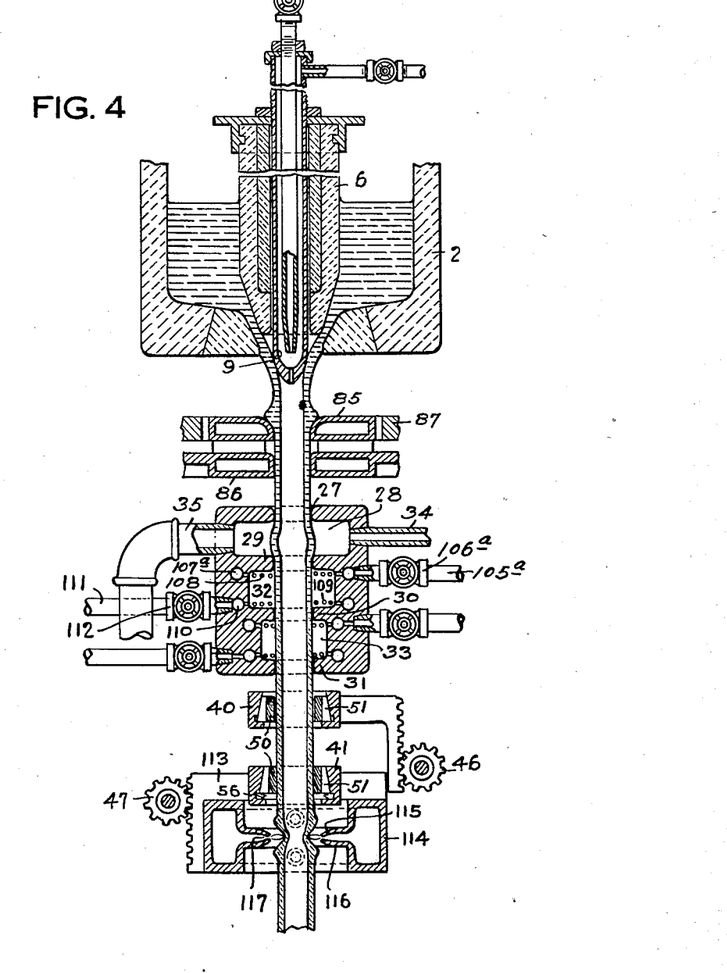
Fig. 4 is a vertical sectional view similar to Fig. 1 showing further modifications.

Figure 4 shows a receptacle 2, a plug 6 and a mandrel 9, constructed and arranged as shown in Fig. 1, and a former constructed in sections as shown in Fig. 3. The apparatus shown in Fig. 4 differs from that of the preceding figures in the construction of the sizing apparatus, and also in the provision of a device for severing lengths of finished tubing. The sizer shown in Fig. 4 has an upper inlet opening 27, a swelling chamber 28 and sizing rings 29, 30 and 31, as in Fig. 1, and this swelling chamber 28 is provided with a fuel inlet 34 and with an outlet 35 for gases of combustion.

The cooling chambers 32 and 33 between the sizing rings 29, 30 and 31 are provided with means for not only maintaining these chambers under sub-atmospheric pressure, but also for keeping currents of air circulating through these chambers. Each chamber is provided with an air intake pipe 105ᵃ controlled by a valve 106ᵃ and communicating with an annular port 107ᵃ which, in turn, communicates through small openings 108 with the interior of the cooling chamber. A similar series of openings 109 permit the air to escape into an annular passage 110 which communicates with an exhaust-pipe 111 controlled by a valve 112, and leading to a suitable blower or other source of suction.

The drawing clamps 40 and 41 are shown on Fig. 4, together with a flame cut-off device carried by the horizontal arm 113 of the lower clamp. This device may consist of a hollow ring 114, the interior of which is connected by flexible connections, not shown, to sources of oxygen and acetylene or other gases capable of producing intense flame. Internal flanges 115 and 116 are formed within the ring 114 and are so shaped as to form a series of nozzle openings 117 which project flame upon the tube for the purpose of separating the tube into suitable lengths. The flame cutoff device rises and falls with the lower drawing clamp, and by suitable means, not shown, the flame may be shut off while this clamp is rising, and may be turned on during the descent of the clamp. This may take place so as to cut off one length of tube for each reciprocation of the clamp, or, if desired, the flame cutoff may be operated periodically so as to cut off any desired lengths of tubing.

It will be understood that the several mechanisms which are employed in carrying out this system may be spaced apart any suitable distance in accordance with the size and character of the tubing that is being drawn. It will also be understood that the cross-section of the tube need not be circular, but may be made rectangular, hexagonal, or of any other desired shape, by properly shaping the former and the sizing rings. If tubing of non-circular section is being drawn, the ironing or compressing elements may be made to reciprocate lengthwise of the tubing instead of rocking or revolving around the tube. Such reciprocation may be produced by means of rack and pinion devices like those shown in Figs. 1 and 4 for reciprocating the drawing clamps.

In starting the operation of this system, as thus far described, the glass is first allowed to flow freely from the discharge outlet 5, and the plug 6 and the mandrel 9 are adjusted vertically so as to produce a stream of the proper size. This stream is at first not engaged by the forming, sizing and drawing apparatus, these parts being preferably so constructed as to be withdrawn in sections, or otherwise, from the path of the descending glass during this starting operation. The annular stream decreases in section as it descends, after the manner of an ordinary solid stream of glass flowing through an opening, and this decrease in section enables the former to surround the stream below the forming level without engaging the flowing glass. The former may then be raised until it engages the flowing stream, and the proper position of the former is determined by noting the slight accumulation of glass which is produced just above the former, as shown on the drawing. When the descending tube has thus been established by the former, the sizing apparatus is applied to the descending tube, and the operation thereafter is continuous.

This method of starting the apparatus may be varied by bringing the sections of the former to about the proper height, with the sections separated so as not to engage the glass, then moving the former sections inwardly to touch the glass, and, if necessary, moving the former up or down until the proper flow through the former is established.

Figure 6:
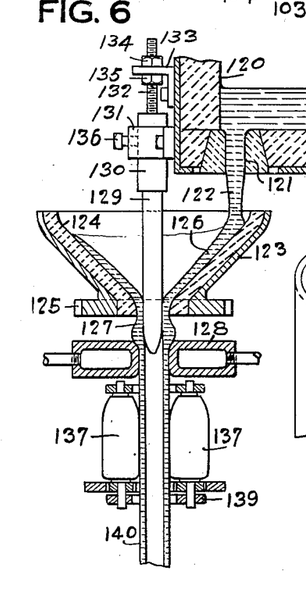
Fig. 6 is a vertical sectional view showing a modified arrangement for initially forming and ironing the tube.

Fig. 6 shows a modified system in which a receptacle 120 is provided with a downward discharge outlet 121 which need not be obstructed by a plug or other implement unless it is desired to provide for shutting off the flow of glass at this point, in which case an ordinary plug may be provided to seat in the upper end of this discharge opening. The stream of glass 122 descends from the outlet 121 and is received upon the inner surface of a rotating funnel 123 having a refractory lining 124. A layer of frozen glass first accumulates on the inner surface of the funnel, and thereafter the issuing glass engages only this glass surface, thus avoiding streaks which might be produced if the glass were continuously brought into contact with a metal or clay surface. The funnel 123 is shown provided with a spur gear 125 which may be driven by any suitable power connections, not shown. The glass is deposited evenly upon the funnel, as shown at 126, and descends in an annular stream 127 which accumulates somewhat just above a rotatable hollow former 128.

A mandrel 129 is suspended within the funnel 123, to assist in cooling and shaping the interior of the descending stream of glass. As shown, the mandrel 129 is suspended from a cylindrical support 130 which extends through an opening in a bracket 131 secured to the side of the glass receptacle 120. A screw 132 extends from the top of the supporting member 130 and through an opening in an angle bracket 133. Nuts 134 and 135 are applied to the screw 132 above and below the bracket 133 for adjusting the vertical position of mandrel 129. A set screw 136 may be provided to secure the support 130 in its adjusted position.

Below the former 128 is a set of ironing or compressing rollers 137 which, as shown, are mounted in a stationary frame 139 and are individually rotated at the same surface speed as that of the descending glass tube 140. Sizing apparatus similar to that shown in Fig. 1 or Fig. 4 may be provided below the ironing device.

This modified system has the advantage that no means are necessary for modifying the issuing stream of glass, and the furnace construction is thereby simplified. The forming and sizing mechanism may be bodily rotated in order to avoid twisting the glass, or these parts may be stationary, in which case the former is relied upon to check the rotation of the glass and thereby to produce a tube which descends without rotating.

The modified system illustrated in Fig. 6 and above described is not being claimed specifically herein as such specific subject matter is reserved for my divisional application, Serial No. 166,774, filed Feb. 8, 1927, in which it is claimed.

Figure 7:
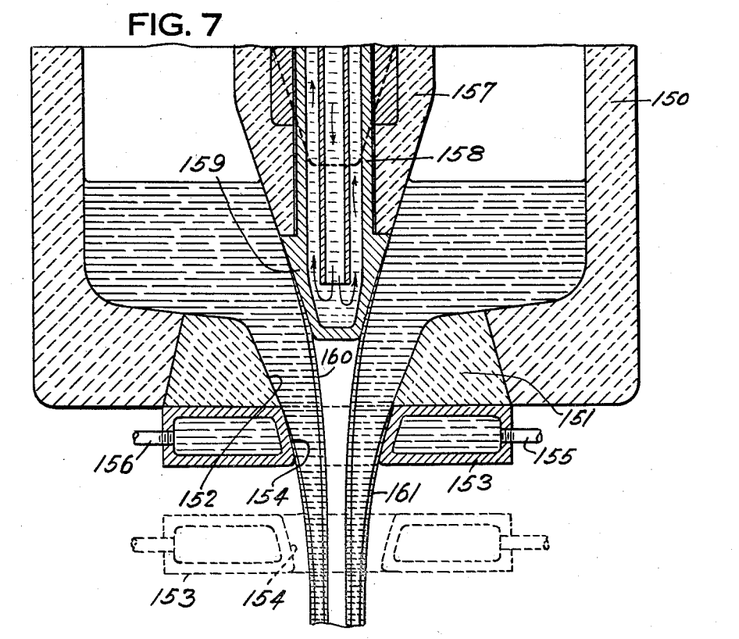
Fig. 7 is a vertical sectional view of part of a modified construction showing one method of starting the apparatus.

A slightly modified device is shown in Fig. 7 mainly for the purpose of illustrating another method of starting the flow of glass from the container. As shown in this figure, a receptacle 150 has a removable flow-bushing 151 having a discharge opening 152, below which is an annular metal member 153 having a central opening 154 that forms a continuation of the discharge opening 152. The member 153 is adjustable between the position shown in full lines, where it rests against the under side of the flow-bushing 151, or nearly so, and a lower position which may be that shown in dotted lines, where an uncontrolled stream flowing from the discharge opening 152 will not touch the walls of the opening 154. The member 153 may be made hollow, and cooling fluid may be circulated through it by means of pipes 155 and 156.

Above the discharge opening 152 is a plug 157 of refractory material which may be constructed like the plug 6 shown in Figs. 1, 2 and 3, except that the mandrel 158 that is contained within the plug 157 is so shaped that its lower end 159 forms a substantial continuation of the lower end of the refractory plug 157. The interior of the mandrel may be provided with means for blowing air through its lower end, as shown in any of the preceding figures. The plug and mandrel are adjustable between the lower full-line position, where they cooperate with the discharge opening 152 to produce an annular stream of glass, and an upper position such as that indicated in dotted lines, where they are well above the discharge opening or even raised entirely above the glass, and therefore do not affect the flow of glass through the discharge opening.

When the apparatus of Fig. 7 is to be started in operation, the plug and mandrel are raised to their upper position and the annular member 153 is lowered to its dotted-line position. Glass is then permitted to flow in a solid stream through the outlet 152, and this stream falls through the member 153 without touching it. When a regular flow has been established and the interior of the receptacle has been brought to proper temperature, the plug and mandrel are lowered to the proper position to cause the glass to issue from the outlet 152 in an annular stream, and the member 153 is raised to its upper position, where the issuing glass flows in contact with the walls of the opening 154. This is the normal running position of the parts shown in Fig. 7. This starting method, where a large and unobstructed outlet is provided for the glass, has the advantage, when working with heat-resisting glass, that it avoids the necessity of heating the glass in the annular flow channel when starting by outside flames or the like, which would have great difficulty in transmitting enough heat to the restricted annular channel.

The cold lower end of the mandrel 158 chills the glass which flows in contact with it, thus producing an internal chilled skin on the issuing glass as shown at 160, this chilling effect being increased if air is blown through the lower end of the mandrel. The cold member 153 operates in a similar manner to provide a chilled skin on the outside of the issuing stream as shown at 161, and the descending glass is thus in proper condition to be acted upon by the forming and sizing devices which may be arranged below the apparatus of Fig. 7 as shown in the preceding figures of the drawing. In making small tubes having thin walls, the apparatus of Fig. 7 may be operated without any additional forming or sizing devices, the mandrel 158 and the annular member 153 being relied upon to chill the walls of the glass tube sufficiently for subsequent handling.

Figure 8:
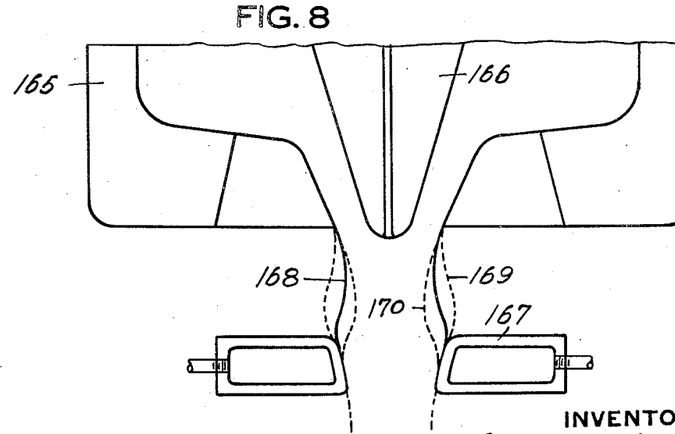
Fig. 8 is a diagrammatic view showing the manner in which the glass flows from the container under various conditions.

Fig. 8 is a diagram illustrating how the shape of the issuing stream of glass varies under changing conditions of temperature or glass supply, and how these variations may be utilized in controlling the operation of the system. A receptacle 165, a plug 166 and a former 167 are indicated in outline, all of the other details of construction being omitted. The full lines 168 indicate a shape which the outer surface of the descending glass may assume when the glass is flowing at a normal rate. If the drawing rate remains constant, and if the glass should be discharged at a faster rate, as a result of increased temperature, increased heat or other change in the glass supply, the descending stream will swell outwardly to a position such as that shown, for example, by the dotted lines 169. Also, if the rate of flow should be decreased, the stream will contract to a position such as that indicated by the dotted lines 170. This inward and outward or "breathing" movement is readily observed by the workman in charge of the machine, who is thus informed when it is necessary to adjust the glass supply to bring the rate of flow back to normal.

As stated above, my present invention is particularly useful in drawing tubes from heat resisting glasses having low coefficient of expansion and high working temperature, because such glasses may be artificially cooled very quickly, as by contact with chilled metal surfaces in the manner herein described, without checking and cracking; while at the same time the glass, delivered at high temperature, rapidly loses heat by radiation and is thus brought quickly to proper consistency for working. It will be understood however, that my invention is not restricted to the use of any particular glass or group of glasses.

The several forms of mandrels herein described may be rotated if desired in order to assist in equalizing the temperature of the issuing glass by a twisting and stirring action, and also in order to compensate for any eccentricity in the shape or position of the mandrel.

In the foregoing specification, and in the claims, the expressions "downwardly" and "upwardly" are to be understood as relating only to the specific embodiment of my invention herein shown, and not as limiting my invention to the drawing of tubes in a vertically descending direction. The principles of my invention are applicable to the drawing of tubing in any direction.

It will be understood that the apparatus for carrying out my invention is herein shown in diagrammatic form, and that my invention may be practiced with the use of any other suitable apparatus and with any modifications of the process steps such as fall within the scope of the appended claims.

I claim as my invention:

1. The method of drawing glass tubing that comprises causing molten glass to flow in an annular stream, contracting the diameter of said stream, then expanding said stream, and forming the stream into a tube.

2. The method of drawing glass tubing that comprises causing molten glass to flow in an annular stream, forming the stream into a tube of approximately the desired diameter, and sizing the initially formed tube by passing the same through dies of different diameters while the glass is still plastic.

3. The method of drawing glass tubing that comprises causing molten glass to flow downwardly in an annular stream, forming the descending stream into a tube of approximately the desired diameter, subjecting the initially formed tube to sub-atmospheric pressure, thereby locally swelling the tube, and then compressing the tube to its final diameter.

4. The method of drawing glass tubing that comprises causing molten glass to flow downwardly in an annular stream, forming the descending stream into a tube of approximately the desired diameter, subjecting the initially formed tube to sub-atmospheric pressure, thereby locally swelling the tube, and then passing the tube through an annular sizer to bring the tube to its final diameter.

5. The method of drawing glass tubing that comprises causing molten glass to flow downwardly in an annular stream, forming the descending stream into a tube of approximately the desired diameter, subjecting the initially formed tube to sub-atmospheric pressure, thereby locally swelling the tube, passing the tube through a plurality of annular sizers, and applying sub-atmospheric pressure to said tube in the intervals between said sizing operations.

6. The method of drawing glass tubing that comprises causing molten glass to flow downwardly in an annular stream, forming the descending stream into a tube, passing the plastic tube through a forming die, passing the tube through a plurality of sizing dies, and applying downward traction to the said tube.

7. The method of drawing glass tubing that comprises causing molten glass to flow downwardly in an annular stream, forming the descending stream into a tube of approximately the desired diameter, passing the initially formed tube through and in contact with a die while the glass is still plastic, passing the tube through a plurality of sizing dies, and applying downward traction to the said tube.

8. The method of drawing glass tubing that comprises causing molten glass to flow downwardly in an annular stream, forming the descending stream into a tube of approximately the desired diameter, subjecting the initially formed tube to sub-atmospheric pressure, thereby locally swelling the tube, then compressing the tube to its final diameter, and applying downward traction to the said tube.

9. The method of drawing glass tubing that comprises causing molten glass to flow downwardly in an annular stream, forming the descending stream into a tube of approximately the desired diameter, subjecting the initially formed tube to sub-atmospheric pressure, thereby locally swelling the tube, then passing the tube through an annular sizer to bring the tube to its final diameter, and applying downward traction to the said tube.

10. The method of drawing glass tubing that comprises causing molten glass to flow downwardly in an annular stream, forming the descending stream into a tube of approximately the desired diameter, subjecting the initially formed tube to sub-atmospheric pressure, thereby locally swelling the tube, passing the tube through a plurality of annular sizers, applying sub-atmospheric pressure to said tube in the intervals between said sizing operations, and applying downward traction to the said tube.

11. The method of drawing glass tubing that comprises causing molten glass to flow downwardly in an annular stream, directing air into the interior of said stream to cool its interior, passing the descending stream through and into contact with the walls of a forming die, and passing the glass through a plurality of sizing dies.

12. The method of drawing glass tubing that comprises causing molten glass to flow downwardly in an annular stream, directing air into the interior of said streams to cool its inner surface, cooling and shaping the outer surface of the descending stream, permitting the tube thus formed to reheat, applying sub-atmospheric pressure to said tube, thereby swelling the tube locally, compressing the tube to its final diameter, and applying downward traction to the said tube.

13. The method of drawing glass tubing that comprises causing molten glass to flow downwardly in an annular stream, directing air into the interior of said stream to cool its inner surface, cooling and shaping the outer surface of the descending stream, permitting the tube thus formed to reheat, applying sub-atmospheric pressure to said tube, thereby swelling the tube locally, heating the locally swelled portion of said tube, and compressing the tube to its final diameter.

14. The method of drawing glass tubing that comprises causing molten glass to flow downwardly in an annular stream, directing air into the interior of said stream to cool its inner surface, cooling and shaping the outer surface of the descending stream, permitting the tube thus formed to reheat, applying sub-atmospheric pressure to said tube, thereby swelling the tube locally, heating the locally swelled portion of said tube, and applying downward traction to the said tube.

15. The method of drawing glass tubing that comprises causing molten glass to flow downwardly in an annular stream, forming the descending stream into a tube of approximately the desired diameter, subjecting the initially formed tube to sub-atmospheric pressure, thereby locally swelling the tube, then passing the tube through a plurality of annular sizers and directing air upon said tube in the intervals between said sizers.

16. The method of drawing glass tubing that comprises causing molten glass to flow downwardly in an annular stream, forming the descending stream into a tube of approximately the desired diameter, subjecting the initially formed tube to sub-atmospheric pressure, thereby locally swelling the tube, passing the tube through a plurality of annular sizers and applying sub-atmospheric pressure to said tube between the said sizing operations.

17. The method of drawing glass tubing that comprises causing molten glass to flow downwardly in an annular stream, directing air into the interior of said stream to cool its inner surface, cooling and shaping the outer surface of the descending stream, permitting the tube thus formed to reheat, applying sub-atmospheric pressure to said tube, thereby swelling the tube locally, then passing the tube through a plurality of annular sizers, applying sub-atmospheric pressure to the tube between said sizing operations, directing air upon said tube in the said intervals between the sizing operations and applying downward traction to said tube.

18. The method of drawing glass tubing that comprises causing molten glass to flow downwardly in an annular stream, passing said stream through and into contact with the walls of a forming die, passing the tube thus formed through a plurality of sizing dies, causing said tube to descend continuously, and severing the said tube into lengths without stopping its downward movement.

19. The method of drawing glass tubing that comprises causing molten glass to flow downwardly in an annular stream, forming said stream into a solidified tube, causing said tube to descend continuously, intermittently applying a severing flame to the said tube and causing said flame to advance with the said tube, thereby severing the tube into lengths without stopping its movement.

20. Apparatus for drawing glass tubing, comprising a receptacle for molten glass having a downwardly opening discharge outlet, means for causing glass to issue from said outlet in an annular stream, rigid means adapted to contact with the exterior of said stream, for giving a desired size to the exterior of said stream, and a series of sizing dies for forming said stream into a solidified tube.

21. Apparatus for drawing glass tubing comprising a receptacle for molten glass having a downwardly opening discharge outlet, means for causing glass to issue from said outlet in an annular stream, means for forming the descending stream into a tube of approximately the desired diameter, and rigid means spaced vertically from the forming means for thereafter sizing the initially formed tube while the glass is still plastic.

22. Apparatus for drawing glass tubing comprising means for causing molten glass to flow downwardly in an annular stream, a rigid former for shaping the descending stream into a tube of approximately the desired diameter, a mandrel for engaging the inner surface of the said descending stream, and means for adjusting the mandrel relative to the former.

23. Apparatus for drawing glass tubing comprising means for causing molten glass to flow downwardly in an annular stream, a rigid former for shaping the descending stream into a tube of approximately the desired diameter, a mandrel for engaging the inner surface of the descending stream, means for directing air through said mandrel into the interior of said stream, and means for adjusting the mandrel relative to the former.

24. Apparatus for drawing glass tubing comprising a receptacle having a downwardly opening discharge outlet, a plug adjustably mounted above said outlet and having a tapered lower end co-operating with said outlet to form the issuing glass into an annular stream, a hollow mandrel disposed within and extending below said plug, means for circulating cooling fluid through said mandrel, and means for causing a stream of air to issue from the lower end of said mandrel.

25. Apparatus for drawing glass tubing comprising means for causing molten glass to flow downwardly in an annular stream, a former for shaping the descending stream into a tube of approximately the desired diameter, means for subjecting the initially formed tube to sub-atmospheric pressure, thereby locally swelling the tube, and means for then compressing the tube to its final diameter.

26. Apparatus for drawing glass tubing comprising means for causing molten glass to flow downwardly in an annular stream, a former for shaping the descending stream into a tube of approximately the desired diameter, means for subjecting the initially formed tube to sub-atmospheric pressure, a plurality of spaced sizing members for compressing the tube to its final diameter, and means for applying sub-atmospheric pressure to said tube in the intervals between said sizing members.

27. Apparatus for drawing glass tubing comprising a receptacle for molten glass having a downwardly opening discharge outlet, a former projecting downwardly into the outlet for causing glass to issue from said outlet in an annular stream, rigid means spaced from the former for sizing the exterior of the descending stream and solidifying it into a tube, and means for applying downward traction to said tube.

28. Apparatus for drawing glass tubing comprising receptacle for molten glass having a downwardly opening discharge outlet, means for causing glass to issue from said outlet in an annular stream, a former spaced below said outlet, a sizer spaced below said former, and drawing means below said sizer for applying downward traction to the glass tube.

29. Apparatus for drawing glass tubing comprising a container for molten glass having an outlet in the bottom thereof for the downward discharge of an annular stream of the glass, a former having an upper shaping portion and a lower portion movable to iron or compress the glass tube, and means for circulating cooling fluid through both of the said portions.

30. Apparatus for drawing glass tubing comprising a sizer having an upper compartment, means for maintaining sub-atmospheric pressure in the said compartment, and a plurality of spaced sizing members disposed below said compartment.

31. Apparatus for drawing glass tubing comprising a sizer having an upper compartment, means for maintaining sub-atmospheric pressure in said compartment, means for introducing flame into said compartment, a plurality of spaced sizing rings disposed below said compartment and means for maintaining sub-atmospheric pressure in the spaces between said sizing rings and for also circulating air through the said spaces.

32. Apparatus for drawing glass tubing comprising means for establishing a descending annular stream of molten glass, means for forming said stream into a solidified tube including a rigid die adapted to receive and engage said stream, and means for applying downward traction to the said tube, said traction means comprising two clamps, means for reciprocating each of said clamps vertically, and means for causing said clamps to engage and pull the glass tubes during their downward movement.

33. Apparatus for drawing glass tubing comprising means for establishing a descending annular stream of molten glass, means for forming said stream into a solidified tube, and means for applying downward traction to the said tube, said traction means comprising two clamps, means for reciprocating each of said clamps vertically, and a burner carried by one of the said clamps for severing the glass tube into lengths.

34. Apparatus for drawing glass tubing comprising a receptacle having a downwardly opening discharge outlet; an annular member disposed below said outlet and adjustable vertically therebeneath, said annular member, when in its upper position, forming a substantial continuation of said discharge outlet, means for cooling said annular member, and a vertically adjustable plug disposed above said discharge outlet and having a lower end adapted to chill the glass flowing in contact with said lower end.

35. The method of establishing a descending annular stream of molten glass that comprises causing the glass to issue from a container in a solid stream through a downwardly opening discharge outlet, lowering a plug toward said outlet, thereby causing the issuing glass to assume an annular form, applying to the descending glass, below said discharge outlet, an annular member forming a substantial continuation of said discharge outlet, and cooling said annular member and the lower end of said plug, thereby chilling the inner and outer surfaces of the descending glass.

36. In apparatus for drawing glass tubing, a sizing die comprising a compartment for applying sub-atmospheric pressure around the tube passing therethrough, and an annular sizing portion for controlling the outer diameter of said tube.

37. The method of drawing glass tubing that comprises causing molten glass to flow downwardly through an orifice in an annular stream, contracting the cross section of said stream, then enlarging the said contracted cross section of said stream, then again contracting the cross section of said stream, and forming said stream into a solidified tube.

38. The method of forming molten glass into articles of substantially uniform cross section that comprises the steps of passing a stream of molten glass through and into contact with the walls of a forming die, subjecting the glass to a locally applied heating medium while passing the die.

39. The method of forming molten glass into articles of substantially uniform cross section, that comprises passing a stream of molten glass vertically downward through and into contact with the walls of a plurality of forming dies, and subjecting the glass to a locally applied heating medium while passing between certain of the dies.

40. The method of forming molten glass into articles of substantially uniform cross section, that comprises passing a stream of molten glass successively through and into contact with the walls of a series of spaced forming dies.

41. The method of drawing glass tubing that comprises the steps of forming the glass into an annular stream at the discharge outlet of a container for a supply of molten glass, passing the annular stream through and in contact with the walls of a forming die to form a tube, and then passing the tube through a sizing die to produce a solidified tube of desired diameter.

42. The method of drawing glass tubing that comprises the steps of forming the glass into an annular stream at the discharge outlet of a container for a supply of molten glass, passing the annular stream over a mandrel to shape its interior, passing the resulting tube through and in contact with the walls of a forming die to shape the exterior of the tube, and then passing the tube through a sizing die to produce a solidified tube of desired diameter.

43. The method of drawing glass tubing that comprises the steps of forming the glass into an annular stream at the discharge outlet of a container for a supply of molten glass, passing the annular stream through and in contact with the walls of a forming die, passing the tube through a sizing die to produce a solidified tube of desired diameter, and subjecting the tube to a heating medium before the tube passes through the sizing die.

44. The method of drawing glass tubing that comprises the steps of forming the glass into an annular stream at the discharge outlet of a container for a supply of molten glass, passing the annular stream through and in contact with the walls of a forming die, subjecting the tube to a heating medium to produce a solidified tube of desired diameter, passing the tube through a sizing die, and applying downward traction to the said tube.

45. The method of drawing glass tubing that comprises the steps of forming the glass into an annular stream at the discharge outlet of a container for a supply of molten glass, passing the annular stream through and in contact with the walls of a forming die, passing the tube through a plurality of sizing dies to produce a solidified tube of desired diameter, and subjecting the tube to a heating medium before the tube passes through the sizing dies.

46. The method of drawing glass tubing that comprises the steps of forming the glass into an annular stream at the discharge outlet of a container for a supply of molten glass, passing the annular stream over a mandrel to shape its interior, passing the resulting tube through and in contact with the walls of a forming die to shape the exterior of the tube, passing the tube through a sizing die to produce a solidified tube of desired diameter, and directing a current of air through said tube during the formation thereof.

47. The method of drawing glass tubing that comprises the steps of forming the glass into an annular stream at the discharge outlet of a container for a supply of molten glass, passing the annular stream over a mandrel to shape its interior, passing the resulting tube through a plurality of sizing dies, subjecting the tube to a heating medium before the exterior of the tube passes through the dies, and directing a cooling medium through said tube during the formation thereof.

48. The method of drawing glass tubing that comprises the steps of forming the glass into an annular stream at the discharge outlet of a container for a supply of molten glass, passing the annular stream over a mandrel to shape its interior, passing the tube through a plurality of sizing dies, subjecting the tube to a heating medium before the tube passes through the dies, causing the tube to swell between adjacent dies, directing a cooling medium through said tube during the formation thereof, and continuously drawing the tube downwardly.

49. In a tube forming device, the combination of a container for molten glass having an outlet opening in the bottom thereof, a vertically disposed blow pipe projecting downward through said opening, the lower portion of said pipe providing a shaping surface over which the glass flows after passing the outlet opening, and means interposed between the said pipe, and outlet to distribute the glass to said pipe.

50. In a tube forming device, the combination of a container for molten glass having an outlet opening in the bottom thereof, a vertically disposed blow pipe projecting downward through said opening, the lower portion of said pipe providing a shaping surface over which the glass flows after passing the outlet opening, and means separate from the blow pipe adjustable to vary the distribution of glass to said blow pipe.

51. In a tube forming device, the combination of a container for a pool of molten glass having an outlet opening in the bottom thereof, a vertically disposed blow pipe projecting downward through the glass in the container and through said opening and providing a surface over which the glass flows as it issues from the pool, means to vary the distribution of glass to said blow pipe, and means to vary the diameter of tube drawn.

52. The method of forming glass tubing which consists in causing molten glass to flow vertically downward from a pool of molten glass in the form of a tube and forming said tube at the point of departure of the glass from the pool, and causing a rotary movement of the glass at said point of departure.

53. The method of drawing cylindrical glass which consists in causing molten glass to issue vertically downward from a pool of molten glass in cylindrical form and imparting the cylindrical formation to the glass at the point of departure from the pool, and causing a rotary movement of the glass at said point of departure.

54. The method which consists in causing a rotative movement of glass in a pool of molten glass, and drawing the rotating glass away from the pool in the form of a tube extending vertically downward from the pool and formed at the point of departure from the pool.

55. The method which consists in continuously supplying molten glass to a pool of molten glass, causing a rotative movement of glass in the pool, drawing the rotating glass continuously away from the pool in a cylindrical form extending vertically downward from the pool, and causing said form to be imparted to the glass at its point of departure from the pool.

56. The method which consists in causing a gravity flow of glass in the form of a vertical tube extending downward from a pool of molten glass, and imparting said tubular form to the glass at its point of departure from the pool.

57. The combination of a container for molten glass having an outlet opening in the bottom thereof formed with downwardly convergent walls, a forming device projecting down into said opening and provided with downwardly convergent walls, the walls of said forming device and said outlet together forming an annular downwardly convergent passageway through which glass issues, means for drawing the glass through said passageway, and means to supply air to maintain the glass in tubular form as it is drawn.

58. The combination of a container for molten glass having an outlet opening in the bottom thereof formed with downwardly convergent walls, a forming device projecting down into said opening and, provided with downwardly convergent walls, the walls of said forming device and said outlet together forming an annular downwardly convergent passageway through which glass issues, means for drawing the glass through said passageway, means to supply air to maintain the glass in tubular form as it is drawn, and means for adjusting said forming device up and down and thereby adjusting the thickness of the walls of the drawn tubing.

59. The combination of a container for molten glass having an outlet opening in the bottom thereof, a forming device projecting downwardly into the glass and forming with said outlet a downwardly and inwardly convergent annular passageway for the issuance of glass, means to draw the issuing glass downward in the form of a tube, a blow pipe extending downwardly through the center of and below said forming device and presenting a forming surface over which the glass flows, and means for relatively adjusting said blow pipe and forming device up and down.

60. The combination of a container for molten glass having an outlet opening in the bottom thereof, a forming device projecting downwardly into the glass and forming with said outlet a downwardly and inwardly convergent annular passageway for the issuance of glass, means to draw the issuing glass downward in the form of a tube, a blow pipe extending downwardly through the center of and below said forming device and presenting a downwardly tapered forming surface over which the glass flows, said forming surface being approximately in line with said annular passageway, and means for adjusting said forming device up and down.

61. The combination of a container for molten glass having an outlet opening in the bottom thereof, a forming device projecting downwardly into the glass and forming with said outlet an annular passageway for the issuance of glass, means to draw the issuing glass downward in the form of a tube, a blow pipe extending downwardly through the center of said forming device and having its lower end protruding below the forming device in position to provide a forming surface over which the glass flows as it leaves said forming device, and adjusting devices for separately adjusting said forming device and the blow pipe up and down each independently of the other.

62. In glass working apparatus, means for discharging molten glass from a source of supply in a continuous stream, and a former comprising a plurality of sections surrounding said stream, and means for adjusting said sections radially toward and from the axis of said stream.

63. In glass working apparatus, means for discharging molten glass from a source of supply in a continuous stream, and a former comprising a plurality of sections surrounding said stream, and means for adjusting said sections radially toward and from the axis of said stream and for moving said sections circumferentially of the stream while in contact with the surface of said stream.

64. In glass working apparatus, means for discharging glass from a source of supply in a continuous stream, and a former comprising a frame surrounding said stream, a plurality of sections supported on said frame around said stream for adjustment radially toward and from the axis of the stream, and a plurality of other sections surrounding said stream in spaced relation to said first named sections and supported on said frame for adjustment radially toward and from the axis of the stream and also for movement circumferentially of said stream.

65. In a tube forming device, the combination of a container for molten glass having an outlet opening in the bottom thereof, a forming device projecting downward into the glass in substantially axial alignment with said outlet, and a blow pipe disposed within said forming device and protruding below the forming device in position to be engaged by the issuing glass and thereby assist in imparting a tubular formation to the glass.

66. In a tube forming device, the combination of a container for molten glass having an outlet opening in the bottom thereof, a forming device projecting vertically downward into the glass in substantially axial alignment with said outlet, a blow pipe within and projecting below the said forming device and providing a surface over which the glass flows beyond the forming device, and means to adjust said blow pipe vertically relative to the forming device and thereby vary the inner diameter of the tube being formed.

67. In a glass forming device, the combination of a container for molten glass having an outlet opening in the bottom thereof, a forming device projecting downward into the glass, a stationary blow pipe disposed within and projecting beyond said forming device, said forming device being adapted to be adjusted vertically to vary the volume of glass passing from said forming device to said blow pipe.

68. The combination of a container for molten glass having an outlet opening in the bottom thereof, a shaping member projecting downward into the glass concentrically with said opening and forming with the opening an annular passageway through which the glass issues, the lower portion of said member having a downwardly tapered surface over which the glass flows, means for causing a continuous discharge of glass through said passageway, a forming member, and means to supply air through the center of said forming member.

69. Glass feeding apparatus comprising a container for molten glass having a downwardly opening discharge outlet, a shaping die adapted to surround and aid in shaping glass that has issued from said outlet, and means for causing an abnormal pressure on part of the glass within said die.

70. Glass feeding apparatus comprising a container for molten glass having a discharge outlet, an annular shaping member substantially alined with said outlet for receiving glass that has issued from the outlet, and means for causing sub-atmospheric pressure on part of the glass within said shaping member.

71. Glass feeding apparatus comprising a container for molten glass having a downwardly opening submerged discharge outlet and an annular shaping member substantially alined with and spaced below the outlet for receiving and shaping glass that has issued from the outlet, said shaping member having ports in its inner wall at a plurality of different levels for the application of sub-atmospheric pressure to different portions of the glass within said shaping member.

72. The method of feeding molten glass which comprises the steps of establishing discharge of the glass from an outlet, and temporarily retarding the right line movement of a portion of the issued glass by applying sub-atmospheric pressure to the lateral surface of a portion of said issued glass.

73. The method of feeding molten glass which comprises establishing discharge of the glass from a feed outlet, passing the issued glass through an annular member adjacent to the outlet, and applying sub-atmospheric pressure to part of the glass within said annular member to aid in enlarging the cross section of a portion of the issued glass.

74. The method of feeding molten glass which comprises establishing discharge of the glass from a feed outlet, and aiding in regulating the cross section and the rate of right line movement of the issued glass by applying sub-atmospheric pressure around portions of the issued glass at different distances from the discharge outlet.

In testimony whereof I, the said GEORGE E. HOWARD, have hereunto set my hand.

GEORGE E. HOWARD.